(12) United States Patent
Wang et al.

(10) Patent No.: US 12,506,138 B2
(45) Date of Patent: Dec. 23, 2025

(54) SURFACE TREATMENT FOR LITHIUM METAL ANODES

(71) Applicant: GM GLOBAL TECHNOLOGY OPERATIONS LLC, Detroit, MI (US)

(72) Inventors: Biqiong Wang, Madison Heights, MI (US); Fang Dai, Troy, MI (US); Shuru Chen, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 526 days.

(21) Appl. No.: 17/548,499

(22) Filed: Dec. 11, 2021

(65) Prior Publication Data

US 2023/0187607 A1 Jun. 15, 2023

(51) Int. Cl.
| | |
|---|---|
| *H01M 4/139* | (2010.01) |
| *H01M 4/134* | (2010.01) |
| *H01M 4/1395* | (2010.01) |
| *H01M 4/38* | (2006.01) |
| *H01M 10/052* | (2010.01) |
| *H01M 10/0565* | (2010.01) |

(52) U.S. Cl.
CPC ......... *H01M 4/1395* (2013.01); *H01M 4/134* (2013.01); *H01M 4/382* (2013.01); *H01M 10/052* (2013.01); *H01M 10/0565* (2013.01); *H01M 2300/0085* (2013.01)

(58) Field of Classification Search
CPC ....... H01M 4/382; H01M 4/405; H01M 4/139
See application file for complete search history.

(56) References Cited

U.S. PATENT DOCUMENTS

| | | |
|---|---|---|
| 8,974,946 B2 | 3/2015 | Cai et al. |
| 9,160,036 B2 | 10/2015 | Yang et al. |
| 9,252,411 B2 | 2/2016 | Abd Elhamid et al. |
| 9,373,829 B2 | 6/2016 | Xiao et al. |
| 9,647,254 B2 | 5/2017 | Dadheech et al. |
| 9,742,028 B2 | 8/2017 | Zhou et al. |
| 9,923,189 B2 | 3/2018 | Xiao |

(Continued)

FOREIGN PATENT DOCUMENTS

| | | |
|---|---|---|
| CN | 1555591 A | 12/2004 |
| CN | 103947027 A | 7/2014 |

(Continued)

OTHER PUBLICATIONS

English translation of DE 102018/203466 (Year: 2018).*

(Continued)

*Primary Examiner* — Yoshitoshi Takeuchi
(74) *Attorney, Agent, or Firm* — Harness, Dickey & Pierce, P.L.C.

(57) ABSTRACT

A method of preparing a lithium metal electrode for an electrochemical cell, such as a lithium metal battery, includes introducing a treatment gas into a chamber including an electrode precursor. The treatment gas may include a reactant gas and/or a plasma. The electrode precursor includes lithium metal and a passivation layer. The method further includes forming the lithium metal electrode by contacting the treatment gas with the passivation layer to remove at least a portion of the passivation layer. The present disclosure also provides pretreated electrodes and electrode assemblies.

19 Claims, 7 Drawing Sheets

(56) References Cited

U.S. PATENT DOCUMENTS

| | | | |
|---|---|---|---|
| 9,929,435 B2 | 3/2018 | Cai et al. | |
| 9,979,008 B2 | 5/2018 | Dai et al. | |
| 10,084,204 B2 | 9/2018 | Dai et al. | |
| 10,128,481 B2 | 11/2018 | Xiao et al. | |
| 10,199,643 B2 | 2/2019 | Zhou et al. | |
| 10,224,571 B2 | 3/2019 | Yang et al. | |
| 10,434,894 B2 | 10/2019 | Li et al. | |
| 10,483,592 B2 | 11/2019 | Xiao et al. | |
| 10,593,931 B2 | 3/2020 | Adair et al. | |
| 10,673,046 B2 | 6/2020 | Dadheech et al. | |
| 10,749,214 B2 | 8/2020 | Salvador et al. | |
| 10,751,694 B2 | 8/2020 | Dailly et al. | |
| 10,797,301 B2 | 10/2020 | Dai et al. | |
| 10,797,353 B2 | 10/2020 | Adair et al. | |
| 10,814,743 B2 | 10/2020 | Li et al. | |
| 10,907,981 B2 | 2/2021 | Li et al. | |
| 10,919,112 B2 | 2/2021 | Dai et al. | |
| 10,944,096 B2 | 3/2021 | Dai et al. | |
| 10,998,578 B2 | 5/2021 | Dai et al. | |
| 11,114,696 B2 | 9/2021 | Yang et al. | |
| 11,145,897 B2 | 10/2021 | Dai et al. | |
| 11,183,714 B2 | 11/2021 | Yang et al. | |
| 11,309,539 B2 | 4/2022 | Dai et al. | |
| 11,502,287 B2 | 11/2022 | Dai et al. | |
| 2015/0056387 A1 | 2/2015 | Dadheech et al. | |
| 2016/0172681 A1 | 6/2016 | Yang et al. | |
| 2016/0172706 A1 | 6/2016 | Xiao et al. | |
| 2016/0172710 A1 | 6/2016 | Liu et al. | |
| 2017/0162859 A1 | 6/2017 | Yang et al. | |
| 2017/0214079 A1 | 7/2017 | Dai et al. | |
| 2017/0271678 A1 | 9/2017 | Yang et al. | |
| 2017/0288230 A1 | 10/2017 | Yang et al. | |
| 2017/0338490 A1 | 11/2017 | Xiao et al. | |
| 2018/0048022 A1 | 2/2018 | Yang et al. | |
| 2018/0108952 A1 | 4/2018 | Yang et al. | |
| 2018/0301752 A1* | 10/2018 | Sakamoto | H01M 10/0585 |
| 2018/0309165 A1 | 10/2018 | Yersak et al. | |
| 2018/0309166 A1 | 10/2018 | Yersak et al. | |
| 2018/0375148 A1 | 12/2018 | Yersak et al. | |
| 2019/0008211 A1 | 1/2019 | Fornarelli | |
| 2019/0044134 A1 | 2/2019 | Liu et al. | |
| 2019/0058210 A1 | 2/2019 | Dai et al. | |
| 2019/0058215 A1 | 2/2019 | Dai et al. | |
| 2019/0058219 A1 | 2/2019 | Yang et al. | |
| 2019/0067675 A1 | 2/2019 | Xiao | |
| 2019/0074520 A1* | 3/2019 | Woo | H01M 4/62 |
| 2019/0237758 A1* | 8/2019 | Dadheech | H01M 4/0419 |
| 2019/0237810 A1* | 8/2019 | Visco | H01M 4/1395 |
| 2019/0319272 A1 | 10/2019 | Kim et al. | |
| 2019/0372155 A1 | 12/2019 | Yersak et al. | |
| 2020/0358141 A1* | 11/2020 | Jang | H01M 10/4235 |
| 2021/0193985 A1* | 6/2021 | Laramie | H01M 4/366 |
| 2021/0193996 A1* | 6/2021 | Laramie | H01M 4/1395 |

FOREIGN PATENT DOCUMENTS

| | | | | |
|---|---|---|---|---|
| CN | 110534704 A | 12/2019 | | |
| CN | 111463405 A | 7/2020 | | |
| CN | 116259702 A | 6/2023 | | |
| DE | 102018203466 A1 * | 9/2019 | | H01M 10/0562 |
| DE | 102022124713 A1 | 6/2023 | | |
| WO | WO-0129914 A1 * | 4/2001 | | H01M 10/0525 |

OTHER PUBLICATIONS

English translation of WO 01/29914 (Year: 2001).*

Anders, A structure zone diagram including plasma-based deposition and ion etching, 518 Thin Solid Films 4087-90 (2010) (Year: 2010).*

First Office Action for Chinese Patent Application No. 202211248921.0 issued Jun. 27, 2025, with correspondence from China Patent Agent (H.K.) Ltd summarizing Office Action; 11 pages.

* cited by examiner

SURFACE TREATMENT FOR LITHIUM METAL ANODES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a surface treatment for lithium anodes, such as for use in electrochemical cells (e.g., lithium metal batteries).

High-energy density, electrochemical cells, such as lithium-ion batteries can be used in a variety of consumer products and vehicles, such as Hybrid Electric Vehicles (HEVs) and Electric Vehicles (EVs). Typical lithium-ion and lithium sulfur batteries include a first electrode, a second electrode, an electrolyte material, and a separator. One electrode serves as a positive electrode or cathode and another serves as a negative electrode or anode. A stack of battery cells may be electrically connected to increase overall output. Conventional rechargeable lithium-ion batteries operate by reversibly passing lithium-ions back and forth between the negative electrode and the positive electrode. A separator and an electrolyte may be disposed between the negative and positive electrodes. The electrolyte is suitable for conducting lithium-ions and may be in solid (e.g., solid state diffusion), gel, or liquid form. Lithium-ions move from a cathode (positive electrode) to an anode (negative electrode) during charging of the battery, and in the opposite direction when discharging the battery.

Many different materials may be used to create components for a lithium-ion battery. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where $0 \leq x \leq 3$, such as $Li_4Ti_5O_{12}$ (LTO). Where the negative electrode is made of metallic lithium, the electrochemical cell is considered a lithium metal battery or cell. Metallic lithium for use in the negative electrode of a rechargeable battery has various potential advantages, including having the highest theoretical capacity and lowest electrochemical potential. Thus, batteries incorporating lithium metal anodes can have a higher energy density that can potentially double storage capacity, so that the battery may be half the size, but still last the same amount of time as other lithium ion batteries. Thus, lithium metal batteries are one of the most promising candidates for high energy storage systems. However, lithium metal batteries also have potential downsides, including possibly exhibiting unreliable or diminished performance and potential premature electrochemical cell failure.

SUMMARY

In various aspects, the present disclosure provides a method of preparing a lithium metal electrode for an electrochemical cell. The method includes introducing a treatment gas into a chamber including an electrode precursor. The electrode precursor includes lithium metal and a passivation layer. The method further includes forming the lithium metal electrode by contacting the treatment gas with the passivation layer to remove at least a portion of the passivation layer.

In one aspect, the treatment gas is a single treatment gas.

In one aspect, the treatment gas is a reactant. The reactant is configured to react with at least a portion of the passivation layer.

In one aspect, the reactant is configured to react with at least a portion of the passivation layer to change a composition of the passivation layer.

In one aspect, the reactant is selected from the group consisting of: trimethylaluminum (TMA); trimethyl phosphate (TMPO), nitrogen ($N_2$), water ($H_2O$), oxygen ($O_2$), ozone ($O_3$), triethylphosphate (TEPO), titanium isopropoxide (TTIP), or any combination thereof.

In one aspect, the reactant is configured to react with at least a portion of the passivation layer to replace a functional group on a surface of the lithium metal electrode.

In one aspect, the treatment gas is a plasma configured to mechanically engage the passivation layer to remove at least a portion of the passivation layer.

In one aspect, the introducing includes generating the plasma from a compound selected from the group consisting of: Ar, $O_2$, $O_3$, $N_2$, $NH_3$, or any combination thereof.

In one aspect, a temperature inside the chamber is greater than or equal to about 20° C. to less than or equal to about 90° C.

In one aspect, the chamber is substantially free of air.

In one aspect, the treatment case includes a first treatment gas including a reactant and a second treatment gas including a plasma.

In one aspect, the lithium metal electrode is configured to be in direct contact with a gel polymer electrolyte.

In one aspect, the lithium metal electrode is configured to be in direct contact with a liquid electrolyte having a viscosity of greater than or equal to about 0.5 cP.

In one aspect, a surface of the lithium metal electrode is configured to have a contact angle with an electrolyte of greater than or equal to about 0° to less than or equal to about 90°.

In one aspect, an electrochemical assembly including the lithium metal electrode is configured to have an areal discharge capacity of greater than or equal to about 1 $mAh/cm^2$ to less than or equal to about 5 $mAh/cm^2$.

In various aspects, the present disclosure provides a method of preparing a lithium metal electrode assembly for an electrochemical cell. The method includes introducing a treatment gas into a chamber including an electrode precursor. The electrode precursor includes lithium metal and a passivation layer. The method further includes contacting the engagement gas with the passivation layer to remove at least a portion of the passivation layer. The method further includes disposing an electrolyte in direct contact with a surface of the lithium metal electrode.

In one aspect, the electrolyte is a gel polymer electrolyte.

In one aspect, the disposing includes, disposing a layer on the surface. The layer including a monomer and an initiator. The disposing further includes crosslinking the monomer to form the gel polymer electrolyte by exposing the layer to UV radiation.

In one aspect, the electrolyte is a liquid electrolyte having a viscosity of greater than or equal to about 0.5 cP.

In various aspects, the present disclosure provides a lithium metal battery. The lithium metal battery includes a positive electrode, a pretreated lithium metal electrode, an electrolyte, and a separator. The positive electrode includes a positive electroactive material. The electrolyte is in direct contact with the pre-treated lithium metal electrode. The electrolyte includes one of, (i) a gel polymer electrolyte, or (ii) a liquid electrolyte having a viscosity of greater than or equal to about 0.5 cP. The separator is ionically conductive and electrically insulating. The pretreated lithium metal electrode is configured to have a contact angle of greater than or equal to about 0° to less than or equal to about 90° with the electrolyte. The lithium metal battery is configured to have an areal discharge capacity of greater than or equal to about 1 mAh/cm$^2$ to less than or equal to about 5 mAh/cm$^2$.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rechargeable lithium metal batteries, which may be used in vehicle applications. However, the present technology may also be used in other electrochemical devices that cycle lithium ions, such as handheld electronic devices or energy storage systems (ESS).

General Electrochemical Cell Function, Structure, and Composition

Figure 1:
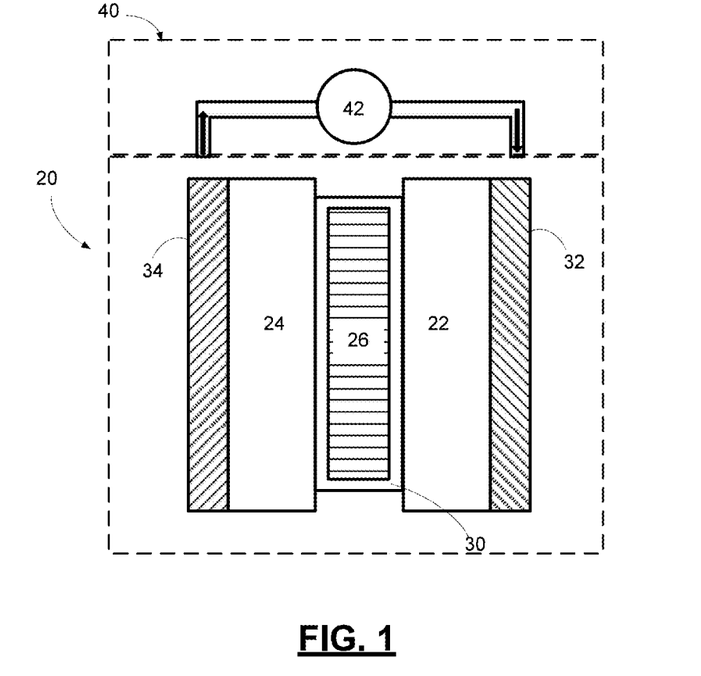
FIG. 1 is a schematic illustration of an electrochemical cell for cycling lithium ions.

By way of background, an exemplary and schematic illustration of an electrochemical cell (also referred to as a battery) 20 is shown in FIG. 1. Although the illustrated examples include a single positive electrode or cathode and a single negative electrode or anode, the skilled artisan will recognize that the present disclosure also contemplates various other configurations, including those having one or more cathodes and one or more anodes, as well as various current collectors with electroactive layers disposed on or adjacent to one or more surfaces thereof.

A typical lithium-ion battery 20 includes a first electrode (such as a negative electrode 22 or anode) opposing a second electrode (such as a positive electrode 24 or cathode) and a separator 26 and/or electrolyte 30 disposed therebetween. While not shown, often in a lithium-ion battery pack, batteries or cells may be electrically connected in a stack or winding configuration to increase overall output. Lithium-ion batteries operate by reversibly passing lithium ions between the first and second electrodes. For example, lithium ions may move from the positive electrode 24 to the negative electrode 22 during charging of the battery, and in the opposite direction when discharging the battery. The electrolyte 30 is suitable for conducting lithium ions and may be in liquid or gel.

When a liquid or semi-liquid/gel electrolyte is used, the separator 26 (e.g., a microporous polymeric separator) is thus disposed between the two electrodes 22, 24 and may comprise the electrolyte 30, which may also be present in the pores of the negative electrode 22 and positive electrode 24. A negative electrode current collector 32 may be positioned at or near the negative electrode 22 and a positive electrode current collector 34 may be positioned at or near the positive electrode 24. An interruptible external circuit 40 and a load device 42 connects the negative electrode 22 (through its current collector 32) and the positive electrode 24 (through its current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the electrolyte solution 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of transition metal ions, at the positive electrode 24 so that electrons and lithium ions are produced. The lithium ions flow from the negative electrode 22 through the electrolyte 30 across the separator 26 to replenish the positive electrode 24 with lithium for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, the separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. The negative electrode current collector 32 and positive electrode current collector 34 respectively collect and move free electrons to and from an external circuit 40.

Further, as noted above, when a liquid or semi-liquid electrolyte is used, the separator 26 operates as an electrical insulator by being sandwiched between the negative electrode 22 and the positive electrode 24 to prevent physical contact and thus, the occurrence of a short circuit. The separator 26 provides not only a physical and electrical barrier between the two electrodes 22, 24, but also contains the electrolyte solution in a network of open pores during the cycling of lithium ions, to facilitate functioning of the battery 20.

The battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

The present technology pertains to making improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of example.

Electrolyte

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in liquid or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes a lithium salt dissolved in an organic solvent or a mixture of organic solvents. Numerous non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

Appropriate lithium salts generally have inert anions. Examples of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bis(trifluoromethanesulfonimide) (LITFSI) ($LiN(CF_3SO_2)_2$); lithium fluorosulfonylimide ($LiN(FsO_2)_2$) (LIFSI); and combinations thereof. In certain variations, the electrolyte 30 may include a 1 M concentration of the lithium salts.

These lithium salts may be dissolved in a variety of organic solvents, such as organic ethers or organic carbonates, by way of example. Organic ethers may include dimethyl ether, glyme (glycol dimethyl ether or dimethoxyethane (DME, e.g., 1,2-dimethoxyethane)), diglyme (diethylene glycol dimethyl ether or bis(2-methoxyethyl) ether), triglyme (tri(ethylene glycol)dimethyl ether), additional chain structure ethers, such as 1-2-diethoxyethane, ethoxymethoxyethane, 1,3-dimethoxypropane (DMP), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane (DME), diglyme (diethylene glycol dimethyl ether), triglyme (tri(ethylene glycol)dimethyl ether), 1,3-dimethoxypropane (DMP), and combinations thereof. Carbonate-based solvents may include various alkyl carbonates, such as cyclic carbonates (e.g., ethylene carbonate (EC), propylene carbonate (PC), butylene carbonate) and acyclic carbonates (e.g., dimethyl carbonate (DMC), diethyl carbonate (DEC), ethyl methyl carbonate (EMC)). Ether-based solvents include cyclic ethers (e.g., tetrahydrofuran, 2-methyltetrahydrofuran, 1,3-dioxolane) and chain structure ethers (e.g., 1,2-dimethoxyethane, 1-2-diethoxyethane, ethoxymethoxyethane).

In various embodiments, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from Celgard LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVDF), polyamide (nylons), polyurethanes, polycarbonates, polyesters, polyetheretherketones (PEEK), polyethersulfones (PES), polyimides (PI), polyimide-imides, polyethers, polyoxymethylene (e.g., acetal), polybutylene terephthalate, polyethylene naphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVDF-hexafluoropropylene or (PVDF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, DE)), polyaramides polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various commercially available polymers and commercial products for forming the separator 26 are contemplated, as well as the many manufacturing methods that may be employed to produce such a porous separator 26.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electroactive material is placed within the metal grid. By way of example, electrically-conductive materials include copper, nickel, aluminum, stainless steel, titanium, alloys thereof, or combinations thereof.

The positive electrode current collector 34 may be formed from aluminum or any other appropriate electrically conductive material known to those of skill in the art. The negative electrode current collector 32 may be formed from copper or any other appropriate electrically conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Positive & Negative Electrodes

The positive electrode 24 may be formed from or include a lithium-based active material that can undergo lithium intercalation and deintercalation, alloying and dealloying, or plating and stripping, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof. However, in certain variations, the positive electrode 24 is substantially free of select metal cations, such as nickel (Ni) and cobalt (Co).

The negative electrode 22 may include a negative electroactive material as a lithium host material capable of functioning as a negative terminal of the lithium-ion battery 20. Common negative electroactive materials include lithium insertion materials or alloy host materials. In certain aspects, the negative electrode 22 includes metallic lithium and the negative electrode 22 is a lithium metal electrode (LME). The lithium-ion battery 20 may be a lithium-metal battery or cell.

Lithium Metal Batteries

Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries. However, the use of lithium metal electrodes also has potential downsides.

First, lithium metal is highly reactive. Accordingly, unless it is stored and transported in an insert environment or vacuum, passivation layers can form on exposed surfaces of the lithium metal. By way of example, passivation layers may include lithium oxides, lithium hydroxide, lithium nitride, lithium carbonate, organics, and/or oils. Passivation layers are generally undesirable because they may reduce wettability of an electrolyte with respect to the lithium metal electrode. Low wettability means that the electrolyte has a small contact angle with the surface of the lithium metal electrode and therefore tends to form discrete islands over the surface, resulting in reduced or poor distribution of the electrolyte over the surface. After polymerization, the electrolyte may create large and uneven tension in the surface of lithium metal electrode, which may reduce or prevent formation of a solid electrolyte interface (SEI) and/or accelerate dendrite formation followed by cell failure.

Second, lithium metal electrodes often have a high surface roughness, such as greater than or equal to about 500 nm. High surface roughness is generally undesirable because it may inhibit formation of an SEI layer. SEI layers may increase cycle life of an electrochemical cell including the lithium metal electrode by reducing or preventing growth of lithium dendrites and/or exhibit flexible properties that lend mechanical protection to the lithium metal electrode. Dendrites are branch- or fiber-like lithium metal structures that may grow on the electrode during cycling. Dendrites may form sharp protrusions that can puncture a separator and potentially cause an internal short circuit.

In various aspects, the present disclosure provides a method of preparing a lithium metal electrode for the electrochemical cell. The method includes exposing a lithium metal electrode precursor having a passivation layer to a treatment gas to chemically and/or mechanically remove at least a portion of the passivation layer. The treatment gas may include a reactant and/or a plasma. The reactant may react with functional groups in the passivation layer to remove or replace the functional groups. The plasma may bombard the passivation layer to mechanically remove all or a portion of the passivation layer. In certain aspects, the method may be performed in a single step (i.e., by injection of a single treatment gas and without further treatment).

The methods of the present disclosure are simple and scalable. In certain aspects, the method may be performed at low temperatures that reduce or prevent softening of the lithium metal electrode. In certain aspects, such as where the treatment gas includes only the plasma, the method may include removing the passivation layer without deposition of another layer onto the electrode. In certain aspects, such as where the treatment gas includes the reactant, the method may be tunable for greatest compatibility (e.g., wettability) of the lithium metal electrode with a desired electrolyte. In certain aspects, the methods may be performed using commercially available atomic layer deposition (ALD) equipment that facilitates tight control of temperature, pressure, and/or dosing. The resulting lithium metal electrodes may have increased wettability, improved SEI layer quality, increased capacity retention, and increased cycle life compared to untreated lithium metal electrodes.

Figure 2:
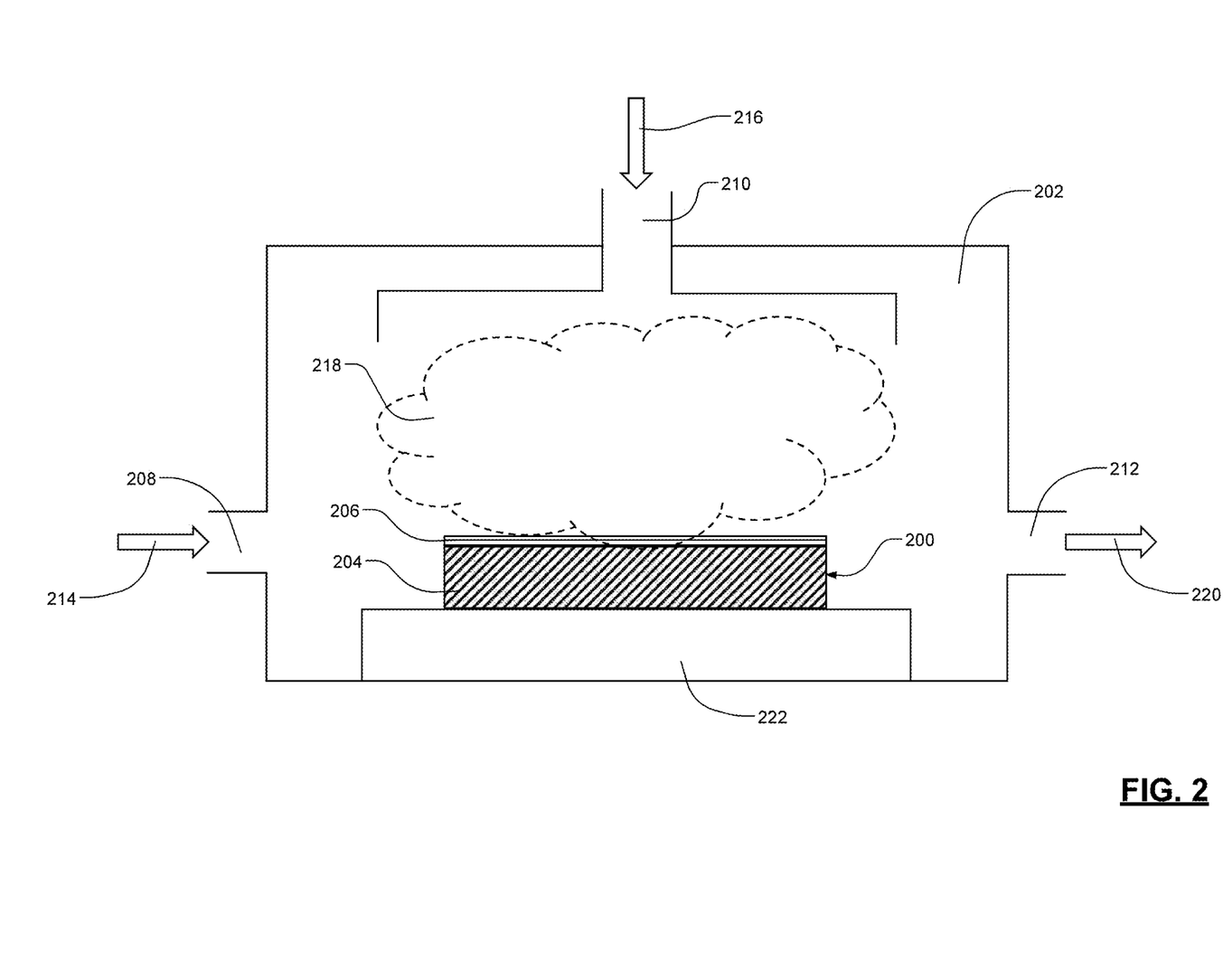
FIG. 2 is a schematic illustration of a method of pre-treating a lithium metal electrode according to various aspects of the present disclosure.

With reference to FIG. 2, the method includes placing an electrode precursor 200 into a glove box or chamber 202. The electrode precursor 200 includes lithium metal body 204 and a passivation layer 206. In certain aspects, the chamber 202 may be part of a commercially available ALD apparatus.

A first inlet 208, a second inlet 210, and an outlet 212 may be fluidly connected to the chamber 202. The first inlet 208 may be configured to inject (e.g., pulse) a reactant gas 214 into the chamber 202. The reactant gas 214 may be injected together with a carrier gas, such as argon or nitrogen. The second inlet 210 may configured to inject a plasma precursor 216, which may also be referred to as a carrier gas. The plasma precursor 216 is heated to form a plasma 218. The reactant gas 214 and the plasma 218 may be collectively referred to as treatment gases. The first and/or second inlets 208, 210 may be provided at different locations. The outlet 212 may be configured to discharge a purge stream 220. The purge stream 220 may include excess reactant, reaction products/byproducts, excess plasma precursor, plasma, removed passivation layer particles from the chamber 202, and/or other residues.

The method includes introducing (e.g., injecting and/or forming) at least one treatment gas into the chamber 202. The treatment gas may be configured to remove all or a portion of the passivation layer 206. In certain aspects, the treatment gas may be configured to remove substantially the entire passivation layer 206. The treatment gas may include the reactant gas 214, the plasma 218, or both the reactant gas 214 and the plasma 218. When the treatment gas includes both the reactant gas 214 and the plasma 218, treatment gases may be supplied sequentially (e.g., reactant gas 214 and then plasma 218 or plasma 218 and then reactant gas 214) or concurrently. In certain aspects, one of the first or second inlets 208, 210 may be omitted. In an example, the treatment gas (i.e., reactant gas 214 and or plasma 218) is supplied in discrete pulses while the outlet 212 remains open constantly.

The reactant gas 214 is configured to react with at least a portion of the passivation layer 206. For example, the reactant gas 214 may be configured to chemically react with a functional group, such as a hydroxide group, in the passivation layer 206. The chemical reaction may cause removal of the functional groups from the passivation layer 206, thereby removing at least a portion of the passivation layer 206. In certain aspects, the chemical reaction may cause replacement of at least a portion of the functional groups with different functional groups. The reactant gas 214 may be selected such that the remaining functional groups are compatible with a desired electrolyte, such as by having a desired droplet contact angle and/or ability to chemically bond with the desired electrolyte. In one example, the reactant gas 214 includes a hydroxide functional group is replaced with an aluminum oxide ($Al_2O_3$) functional group. The Al—O bonds of the added functional group are believed to facilitate stabilization of the lithium metal surface. In certain aspects, the reactant gas 214 may be selected from the group consisting of: trimethylaluminum (TMA); trimethyl phosphate (TMPO), $N_2$; $H_2O$, $O_2$, $O_3$, triethylphosphate (TEPO), titanium isopropoxide (TTIP), or any combination thereof.

For each deposition cycle or pulse, the reactant gas 214 may be supplied to the chamber 202 in an amount greater than or equal to about 1 standard cubic centimeters per minute (sccm), optionally greater than or equal to about 5 sccm, optionally greater than or equal to about 10 sccm, or optionally greater than or equal to about 15 sccm, by way of example. For each deposition cycle, the reactant gas 214 may be supplied to the chamber 202 in an amount less than or equal to about 20 sccm, optionally less than or equal to about 15 sccm, optionally less than or equal to about 10 sccm, or optionally less than or equal to about 5 sccm, by way of example. For each deposition cycle, the reactant gas 214 may be supplied to the chamber 202 for a duration of greater than or equal to about 100 ms, optionally greater than or equal to about 500 ms, optionally greater than or equal to about 1 s, or optionally greater than or equal to about 5 s, by way of example. For each deposition cycle, the duration may be less than or equal to about 10 s by way of example, optionally less than or equal to about 5 s, optionally less than or equal to about 1 s, or optionally less than or equal to about 500 ms, by way of example. The method may include multiple deposition cycles, such as greater than or equal to 1 cycle, optionally greater than or equal to about 5 cycles, optionally greater than or equal to about 10 cycles, optionally greater than or equal to about 20 cycles, optionally greater than or equal to about 30 cycles, optionally greater than or equal to about 40 cycles, optionally greater than or equal to about 50 cycles, optionally greater than or equal to about 60 cycles, optionally greater than or equal to about 70 cycles, optionally greater than or equal to about 80 cycles, optionally greater than or equal to about 90 cycles, optionally greater than or equal to about 100 cycles, by way of example. In certain aspects, the method may include less than or equal to about 100 deposition cycles, optionally less than or equal to about 90 cycles, optionally less than or equal to about 80 cycles, optionally less than or equal to about 70 cycles, optionally less than or equal to about 60 cycles, optionally less than or equal to about 50 cycles, optionally less than or equal to about 40 cycles, optionally less than or equal to about 30 cycles, optionally less than or equal to about 20 cycles, or optionally less than or equal to about 10 cycles, by way of example.

The plasma 218 is configured to mechanically engage (e.g., bombard, impinge) the passivation layer 206 to remove at least a portion of the passivation layer 206. In certain aspects, the plasma precursor 216 may be selected from the group consisting of Ar, $O_2$, $O_3$, $N_2$, $NH_3$, or any combination thereof. The plasma precursor 216 may be heat (e.g., electrically heated) to form the plasma 218. In certain aspects, plasma 218 may be formed in pulses.

For each deposition cycle or pulse, the plasma precursor 216 may be supplied to the chamber 202 in an amount greater than or equal to about greater than or equal to about 10 sccm, optionally greater than or equal to about 20 sccm, optionally greater than or equal to about 30 sccm, optionally greater than or equal to about 40 sccm, optionally greater than or equal to about 50 sccm, by way of example. For each deposition cycle, the plasma precursor 216 may be supplied to the chamber 202 in an amount less than or equal to about 60 sccm, optionally less than or equal to about 50 sccm, optionally less than or equal to about 40 sccm, optionally less than or equal to about 30 sccm, or optionally less than or equal to about 20 sccm, by way of example. For each deposition cycle, the plasma precursor 216 may be supplied to the chamber 202 for a duration of greater than or equal to about 100 ms, optionally greater than or equal to about 500 ms, optionally greater than or equal to about 1 s, or optionally greater than or equal to about 5 s, by way of example. For each deposition cycle, the duration may be less than or equal to about 10 s by way of example, optionally less than or equal to about 5 s, optionally less than or equal to about 1 s, or optionally less than or equal to about 500 ms, by way of example. The method may include multiple deposition cycles, such as greater than or equal to 1 cycle, optionally greater than or equal to about 5 cycles, optionally greater than or equal to about 10 cycles, optionally greater than or equal to about 20 cycles, optionally greater than or equal to about 30 cycles, optionally greater than or equal to about 40 cycles, optionally greater than or equal to about 50 cycles, optionally greater than or equal to about 60 cycles, optionally greater than or equal to about 70 cycles, optionally greater than or equal to about 80 cycles, optionally greater than or equal to about 90 cycles, optionally greater than or equal to about 100 cycles, by way of example. In certain aspects, the method may include less than or equal to about 100 deposition cycles, optionally less than or equal to about 90 cycles, optionally less than or equal to about 80 cycles, optionally less than or equal to about 70 cycles, optionally less than or equal to about 60 cycles, optionally less than or equal to about 50 cycles, optionally less than or equal to about 40 cycles, optionally less than or equal to about 30 cycles, optionally less than or equal to about 20 cycles, or optionally less than or equal to about 10 cycles, by way of example.

Environmental conditions of the chamber 202 may be tightly controlled. In certain aspects, a pressure within the chamber 202 may be greater than or equal to about 100 mTorr, optionally greater than or equal to about 500 mTorr, optionally greater than or equal to about 1 mTorr, or optionally greater than or equal to about 2 mTorr, by way of example. The pressure may be less than or equal to about 5 Torr, optionally less than or equal to about 2 Torr, optionally less than or equal to about 1 Torr, or optionally less than or equal to about 500 mTorr. In certain aspects, the chamber 202 may be substantially free of air.

In certain aspects, the electrode precursor 200 may be disposed on a temperature-controlled stage 222. The temperature-controlled stage 222 may be configured to heat the electrode precursor 200. In certain aspects, aspects, the stage 222 may be controlled to heat the electrode precursor 200 to a temperature of greater than or equal to about 20° C., optionally greater than or equal to about 30° C., optionally greater than or equal to about 40° C., optionally greater than or equal to about 50° C., optionally greater than or equal to about 60° C., optionally greater than or equal to about 70° C., or optionally greater than or equal to about 80° C. The temperature may be less than about 90° C., optionally less than or equal to about 80° C., optionally less than or equal to about 70° C., optionally less than or equal to about 60° C., optionally less than or equal to about 50° C., optionally less than or equal to about 40° C., or optionally less than or equal to about 30° C. In an example, the temperature is greater than or equal to about 60° C. to less than or equal to about 70° C. In other aspects, the method may be performed at room temperature or about 23° C.

In certain aspects, the method may further include disposing an electrolyte in contact with a surface of the lithium metal electrode. The electrolyte may be disposed on the lithium metal electrode outside of the chamber. The electrolyte may include a liquid electrolyte or a gel polymer electrolyte. In certain aspects, when the electrolyte is a gel polymer electrolyte, the method may include disposing a layer including a monomer and an initiator on the surface of the electrode. The method may further include crosslinking the monomer to form the gel polymer electrolyte, such as by exposing the layer heat and/or UV radiation.

In various aspects, the present disclosure provides a lithium metal electrode. The lithium metal electrode may be formed according to the method discussed in conjunction with FIG. 2. The lithium metal electrode may be substantially free of a passivation layer (see, e.g., electrode 300 of FIG. 3), have a passivation layer that has been mechanically or chemically at least partially removed, and/or having a passivation layer that has been chemically modified (see, e.g., electrode 400 of FIG. 4).

Figure 3:
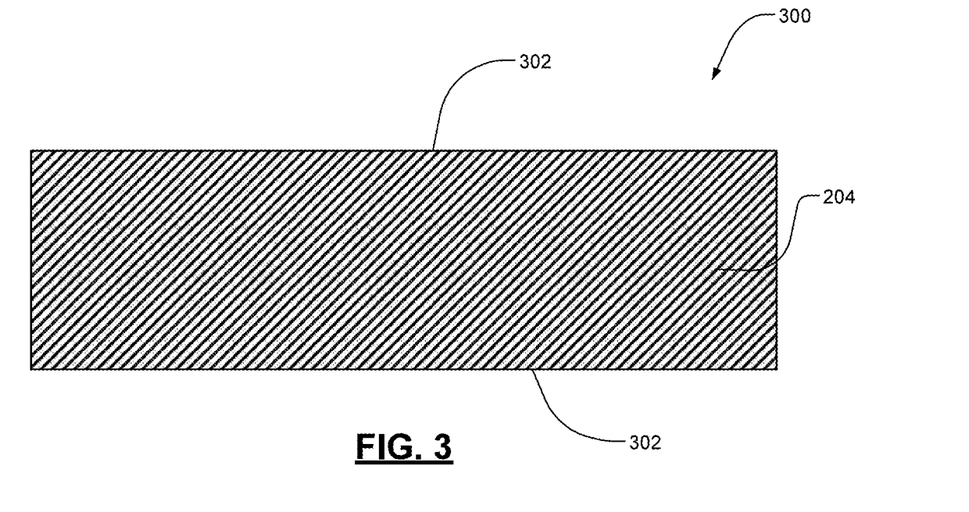
FIG. 3. Is a sectional view of an electrode according to various aspects of the present disclosure, the electrode formed according to the method of FIG. 2.

With reference to FIG. 3, a lithium metal electrode 300 according to various aspects of the present disclosure is provided. The lithium metal electrode 300 includes the lithium metal body 204. The lithium metal body 204 includes surfaces 302. The surfaces 302 may be substantially free of a passivation layer. Accordingly, the surfaces 302 may include lithium metal. In certain aspects, the surfaces 302 may consist essentially of lithium metal.

Figure 4:
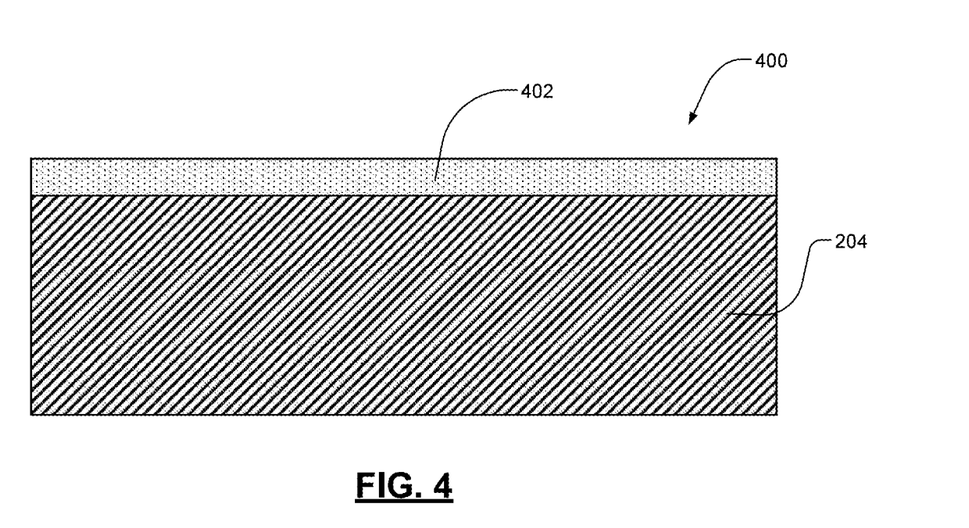
FIG. 4 is a sectional view of another electrode according to various aspects of the present disclosure, the electrode formed according to the method of FIG. 2.

Referring to FIG. 4, a lithium metal electrode 400 according to various aspects of the present disclosure is provided. The lithium metal electrode 400 includes the lithium metal body 204 and a passivation layer 402. The passivation layer 402 is chemically different from the passivation layer 206 of the electrode precursor 200 of FIG. 2, such as having fewer, different, and/or additional functional groups. Added functional groups may, in certain aspects, be configured to chemically bond with an electrolyte to yield improved interface dynamics between the electrolyte and the electrode 400. In an example, the passivation layer 402 includes reduced hydroxide functional groups compared to the passivation layer 206 (FIG. 2). In another example, the passivation layer 402 includes reduced hydroxide functional groups and reduced carbonate functional groups compared to the passivation layer 206.

Figure 5:
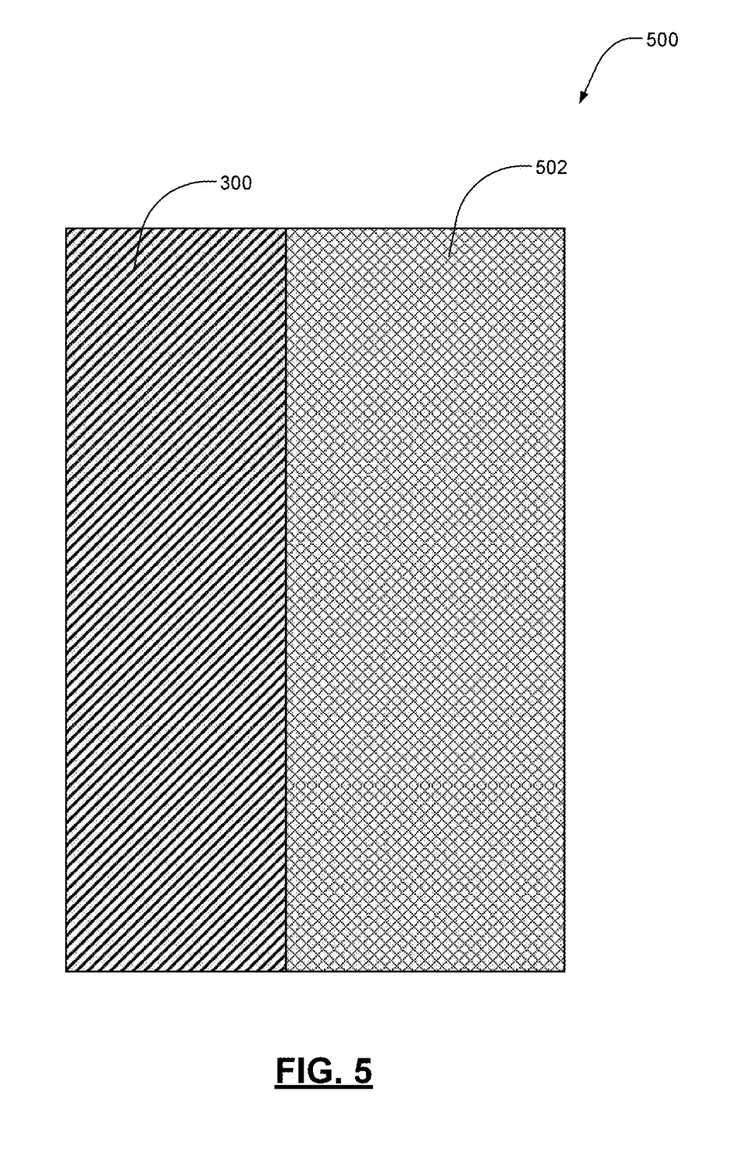
FIG. 5 is a sectional view of an electrode assembly including the electrode of FIG. 3 according to various aspects of the present disclosure.

In various aspects, the present disclosure provides a lithium metal electrode assembly. With reference to FIG. 5, a lithium metal electrode assembly 500 according to various aspects of the present disclosure is provided. The lithium metal electrode assembly 500 includes the lithium metal electrode 300 (or another lithium metal electrode prepared according to the principles of the present disclosure) and an electrolyte 502. The electrolyte may be a gel polymer electrolyte or a liquid electrolyte.

The gel polymer electrolyte may include a polymer matrix (e.g., PEO, PMMA, and/or polymethylacrylate (PMA)), a solvent/plasticizer (e.g., EC, EMC), and a lithium salt (e.g., $LiPF_6$, LiTFSI). In certain aspects, the liquid electrolyte may have a viscosity of greater than or equal to about 0.5 cP, optionally greater than or equal to about 1 cP, or optionally greater than or equal to about 10 cP. In certain aspects, the liquid electrolyte may include a solvent selected salt, such as those described above in the discussion of FIG. 1. For example, the solvent may include EC and/or EMC and the salt may include $LiPF_6$ and/or LiTFSI.

In certain aspects, the electrolyte may have a high wettability with respect to a surface of the electrode. As used herein, wettability is the attraction of the electrolyte to the surface of the electrode. Accordingly, the electrolyte having a high wettability may have a small contact angle with the surface such that it has a tendency to spread and distribute across the surface rather than form discrete islands. The contact angle is an angle formed between the surface of the electrode and a line tangent to an edge of a drop of electrolyte. In certain aspects, the contact angle is greater than or equal to about 0°, optionally greater than or equal to about 10°, optionally greater than or equal to about 20°, optionally greater than or equal to about 30°, optionally greater than or equal to about 40°, optionally greater than or equal to about 50°, optionally greater than or equal to about 60°, optionally greater than or equal to about 70°, or optionally greater than or equal to about 80°. The contact angle may be less than or equal to about 90°, optionally less than or equal to about 80°, optionally less than or equal to about 70°, optionally less than or equal to about 60°, optionally less than or equal to about 50°, optionally less than or equal to about 40°, optionally less than or equal to about 30°, optionally less than or equal to about 20°, optionally less than or equal to about 10°, by way of example.

In various aspects, the electrode 300 is a negative electrode and the electrode assembly 500 may be included in an electrochemical cell having a positive electrode, a separator, and current collectors, such as those described in the discussion accompanying FIG. 1. The positive electrode includes a positive electroactive material, such as lithium nickel manganese cobalt oxide (NMC) (e.g., NMC622 and/or NMC811) and/or aluminum-doped NMC (NMCA).

As discussed above, the electrochemical cell including the electrode assembly 500 may have improved performance compared to an electrochemical cell including a non-treated lithium metal electrode. For example, the improved performance may include an improved areal capacity, an improved cycle life and/or capacity retention. In certain aspects, the electrochemical cell including the electrode assembly 500 may have an areal discharge capacity of greater than or equal to about 1 $mAh/cm^2$, optionally greater than or equal to about 1.5 $mAh/cm^2$, optionally greater than or equal to about 2 $mAh/cm^2$, optionally greater than or equal to about 2.5 $mAh/cm^2$, optionally greater than or equal to about 3 $mAh/cm^2$, optionally greater than or equal to about 3.5 $mAh/cm^2$, optionally greater than or equal to about 4 $mAh/cm^2$, or optionally greater than or equal to about 4.5 $mAh/cm^2$, by way of example. The areal discharge capacity may be less than or equal to about 5 $mAh/cm^2$, optionally less than or equal to about 4.5 $mAh/cm^2$, optionally less than or equal to about 4 $mAh/cm^2$, optionally less than or equal to about 3.5 $mAh/cm^2$, optionally less than or equal to about 3 $mAh/cm^2$, optionally less than or equal to about 2.5 $mAh/cm^2$, optionally less than or equal to about 2 $mAh/cm^2$, or optionally less than or equal to about 1.5 $mAh/cm^2$, by way of example. In certain aspects, after about 100 cycles, the electrochemical cell including the electrode assembly 500 may have a discharge capacity retention of greater than or equal to about 60%, optionally greater than or equal to about 65%, optionally greater than or equal to about 70%, optionally greater than or equal to about 75%, optionally greater than or equal to about 80%, optionally greater than or equal to about 85%, optionally greater than or equal to about 90%, or optionally greater than or equal to about 92%, by way of example. The discharge capacity retention after about 100 cycles may be less than about 100%, optionally less than or equal to about 95%, optionally less than or equal to about 90%, optionally less than or equal to about 85%, optionally less than or equal to about 80%, optionally less than or equal to about 75%, optionally less than or equal to about 70%, or optionally less than or equal to about 65%, by way of example.

Example 1—Wettability of Reactant-Treated Lithium Metal

Figure 6:
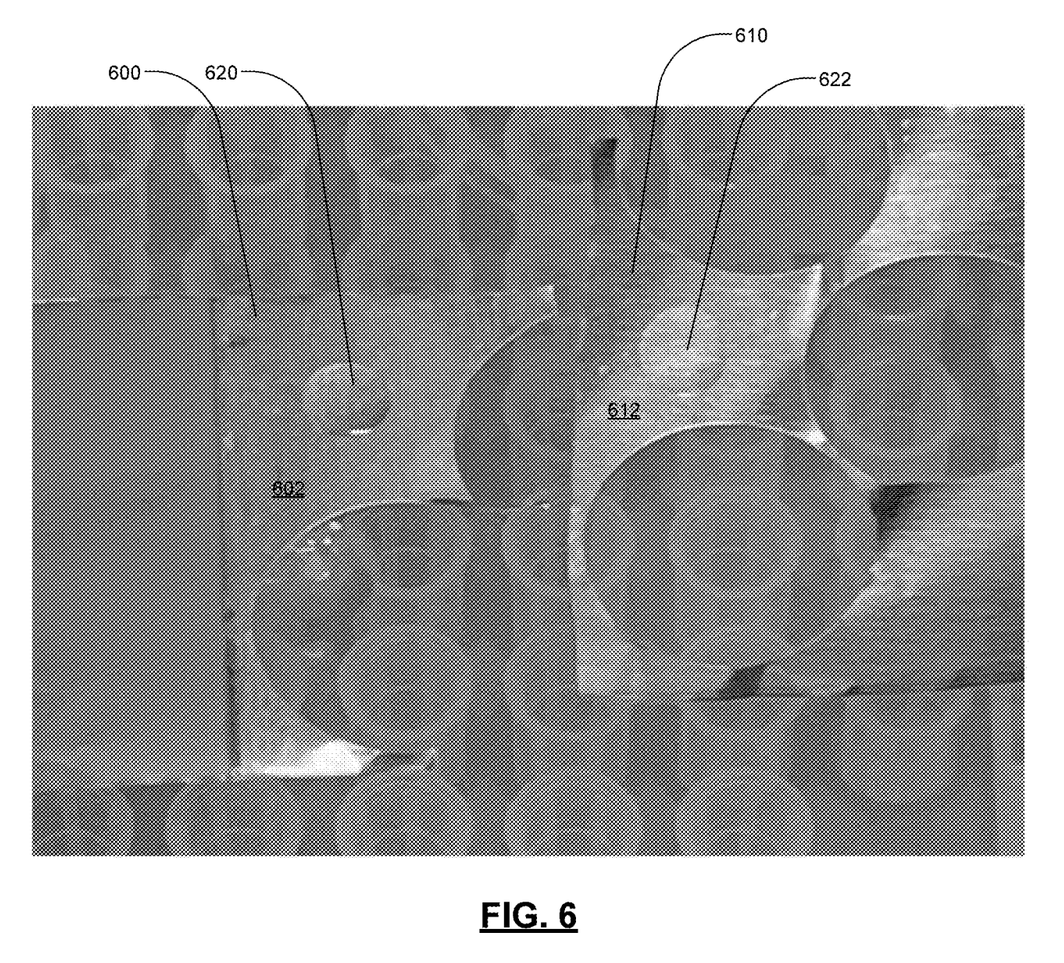
FIG. 6 is a photograph depicting comparative wettability of a first untreated lithium metal sample and a second reactant-treated lithium metal sample prepared according to various aspects of the present disclosure.

Referring to FIG. 6, a first sample 600 is prepared. The first sample 600 includes lithium metal. The first sample 600 is untreated. Therefore, a first surface 602 of the first sample is believed to include a passivation layer. A second sample 610 is prepared according to various aspects of the present disclosure. The second sample 610 is pretreated with TMA, which is injected together with an argon carrier gas. A chamber temperature is greater than or equal to about 20° C. to less than or equal to about 50° C. A chamber pressure is about 250 mTorr. A pulse duration is about 500 msec and a pulse rate is about 10 sccm. 30 pulses/cycles are performed. The TMA is believed to react with at least a portion of the hydroxide groups and/or the carbonate groups in the passivation layer. Therefore, the second sample 610 has a modified passivation layer on a second surface 612.

Contact angles for the first and second samples 600, 610 are observed by disposing a droplet of gel electrolyte precursor liquid on each of the first and second samples 600, 610. The gel electrolyte precursor includes 5 weight percent PMMA with 1M $LiPF_6$ in EC/EMC. More specifically, a first droplet 620 is disposed on the first surface 602 of the first sample 600 and a second droplet 622 is disposed on the second surface 612 of the second sample 610. A contact angle of the second droplet 622 is larger than a contact angle of the first droplet 620. Therefore, the second sample 610 has a greater wettability for electrolyte than the first sample 600. Accordingly, the TMA pretreatment is effective in improving wettability of a lithium metal electrode.

Example 2—Wettability of Plasma-Treated Lithium Metal

Figure 7:
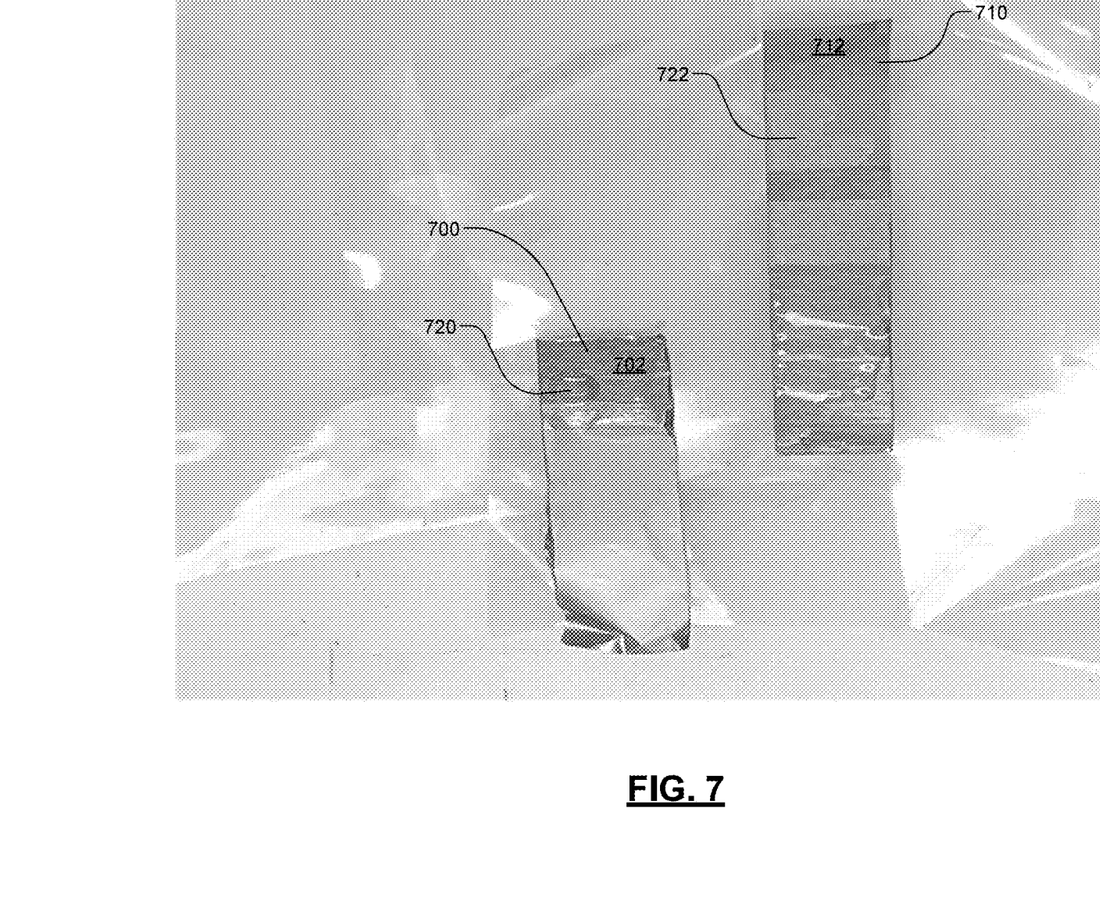
FIG. 7 is a photograph depicting comparative wettability of a first untreated lithium metal sample and a second plasma-treated lithium metal sample prepared according to various aspects of the present disclosure.

Referring to FIG. 7, a first sample 700 is prepared. The first sample 700 includes lithium metal. The first sample 700 is untreated. Therefore, a first surface 702 of the first sample is believed to include a passivation layer. A second sample 710 is prepared according to various aspects of the present disclosure. The second sample 710 is pretreated with argon plasma. A chamber temperature is greater than or equal to about 20° C. to less than or equal to about 50° C. A chamber pressure is about 250 mTorr. A pulse duration is about 5 seconds and a pulse rate is about 10 sccm. 30 pulses/cycles are performed. The plasma is believed to engage a passivation layer mechanically remove at least a portion of the passivation layer. Therefore, the second sample 710 has a reduced or removed passivation layer on a second surface 712.

Contact angles for the first and second samples 700, 710 are observed by disposing a droplet of gel electrolyte precursor on each of the first and second samples 700, 710. The gel electrolyte precursor includes 5 weight percent PMMA with 1M LiPF$_6$ in EC/EMC. More specifically, a first droplet 720 is disposed on the first surface 702 of the first sample 700 and a second droplet 722 is disposed on the second surface 712 of the second sample 710. The second droplet 722 spreads across the second surface 712. A contact angle of the second droplet 722 is much larger than a contact angle of the first droplet 720. Therefore, the second sample 710 has a much greater wettability for electrolyte than the first sample 700. Accordingly, the plasma pretreatment is effective in improving wettability of a lithium metal electrode.

Example 3—Cycling Performance

Three lithium metal batteries are prepared. Each of the three lithium metal batteries includes a 4.2 mAh/cm$^2$ NMC-622 positive electrode; a PMMA-based gel electrolyte including an EX/EMC solvent and LiPF$_6$ salt; and a polyethylene separator. A first lithium metal battery includes an untreated lithium metal negative electrode. A second lithium metal battery includes a TMA-treated (reactant-treated) lithium metal electrode prepared according to the method described in Example 1, above. A third lithium metal battery includes a plasma-treated lithium metal electrode prepared according to the method described in Example 2, above.

Figure 8:
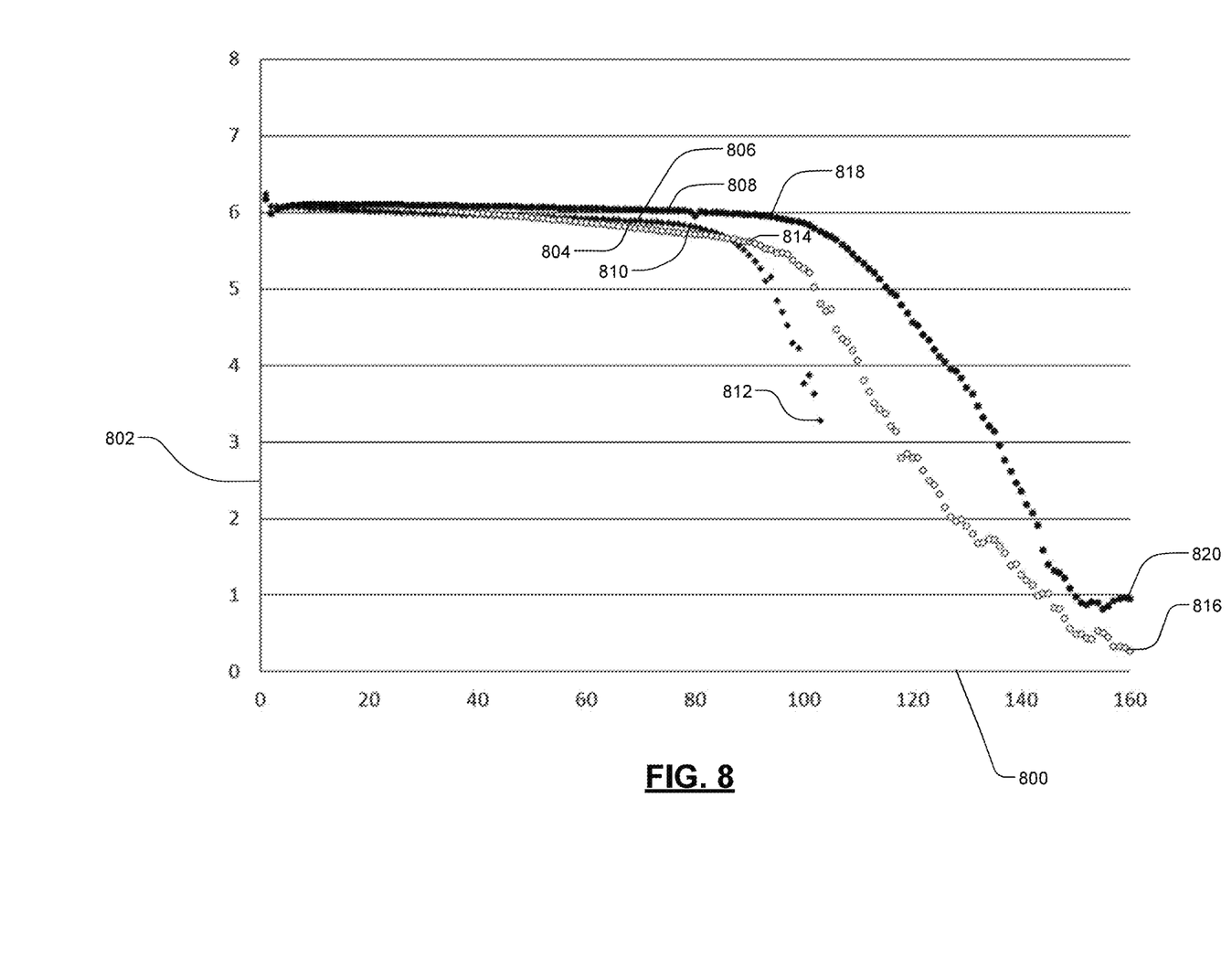
FIG. 8 is a graph depicting comparative cycling performance of a first lithium metal battery including an untreated lithium metal electrode, a second lithium metal battery including a reactant-treated lithium metal electrode according to various aspects of the present disclosure, and a third lithium metal battery including a plasma-treated lithium metal electrode according to various aspects of the present disclosure.

Each of the three lithium metal batteries is cycled at 3-4.3 V and 0.1 CC-0.5 CD. With reference to FIG. 8, cycle performance of the three lithium metal batteries is depicted. An x-axis 800 represents cycle. A y-axis 802 represents capacity in mAh. A first curve 804 represents performance of the first lithium metal battery. A second curve 806 represents performance of the lithium metal battery. A third curve 808 represents performance of the third lithium metal battery. The first lithium metal battery experiences significant capacity fade after about 95 cycles, as shown at 910 and fails at about 102 cycles, as shown at 912. The second lithium metal battery begins experiencing a more gradual capacity fade (compared to the first lithium metal battery) after about 100 cycles, as shown at 814, and is cycled through about 160 cycles, as shown at 816. The third lithium metal battery begins experiencing a more gradual capacity fade (compared to the first and second lithium metal batteries) after about 105 cycles, as shown at 818, and is cycled through about 160 cycles, as shown at 820. Accordingly, the second and third lithium metal batteries, which include pretreated lithium metal negative electrodes, are capable of undergoing more cycles than the untreated lithium metal electrode. Additionally, the second and third lithium metal batteries experience greater capacity retention than the first lithium metal battery, especially after about 95 cycles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A method of preparing a lithium metal electrode for an electrochemical cell, the method comprising:
   introducing a treatment gas into a chamber including an electrode precursor, the electrode precursor including lithium metal and a passivation layer;
   heating the electrode precursor by a temperature-controlled stage to increase a temperature of the electrode precursor; and
   forming the lithium metal electrode by contacting the treatment gas with the passivation layer to remove at least a portion of the passivation layer.

2. The method of claim 1, wherein the treatment gas is a single treatment gas.

3. The method of claim 1, wherein the treatment gas is a reactant configured to react with at least a portion of the passivation layer.

4. The method of claim 3, wherein the reactant is configured to react with at least a portion of the passivation layer to change a composition of the passivation layer.

5. The method of claim 3, wherein the reactant is selected from the group consisting of: trimethylaluminum (TMA); trimethyl phosphate (TMPO), nitrogen (N$_2$), water (H$_2$O), oxygen (O$_2$), ozone (O$_3$), triethylphosphate (TEPO), titanium isopropoxide (TTIP), or any combination thereof.

6. The method of claim 3, wherein the reactant is configured to react with at least a portion of the passivation layer to replace a functional group on a surface of the lithium metal electrode.

7. The method of claim 1, wherein the treatment gas is a plasma configured to mechanically engage the passivation layer to remove at least a portion of the passivation layer.

8. The method of claim 7, the introducing includes generating the plasma from a compound selected from the group consisting of: Ar, O$_2$, O$_3$, N$_2$, NH$_3$, or any combination thereof.

9. The method of claim 1, wherein a temperature inside the chamber is greater than or equal to about 20° C. to less than or equal to about 90° C.

10. The method of claim 1, wherein the chamber is substantially free of air.

11. The method of claim 1, wherein the treatment case includes a first treatment gas including a reactant and a second treatment gas including a plasma.

12. The method of claim 1, wherein the lithium metal electrode is configured to be in direct contact with a gel polymer electrolyte.

13. The method of claim 1, wherein the lithium metal electrode is configured to be in direct contact with a liquid electrolyte having a viscosity of greater than or equal to about 0.5 cP.

14. The method of claim 1, wherein a surface of the lithium metal electrode is configured to have a contact angle with an electrolyte of greater than or equal to about 0° to less than or equal to about 90°.

15. The method of claim 1, wherein an electrochemical assembly including the lithium metal electrode is configured to have an areal discharge capacity of greater than or equal to about 1 mAh/cm$^2$ to less than or equal to about 5 mAh/cm$^2$.

16. A method of preparing a lithium metal electrode assembly for an electrochemical cell, the method comprising:
    introducing a treatment gas into a chamber including an electrode precursor, the electrode precursor including lithium metal and a passivation layer;
    heating the electrode precursor by a temperature-controlled stage to increase a temperature of the electrode precursor;
    preparing the lithium metal electrode by contacting the treatment gas with the passivation layer to remove at least a portion of the passivation layer; and
    disposing an electrolyte in direct contact with the lithium metal on a surface of the lithium metal electrode.

17. The method of claim 16, wherein the electrolyte is a gel polymer electrolyte.

18. The method of claim 16, wherein the disposing includes,
    disposing a layer on the surface, the layer including a monomer and an initiator,
    crosslinking the monomer to form the gel polymer electrolyte by exposing the layer to UV radiation.

19. The method of claim 16, wherein the electrolyte is a liquid electrolyte having a viscosity of greater than or equal to about 0.5 cP.

* * * * *